US011012300B1

(12) United States Patent
Gaeta et al.

(10) Patent No.: US 11,012,300 B1
(45) Date of Patent: *May 18, 2021

(54) MULTI-DEVICE COORDINATED USER EXPERIENCE

(71) Applicant: United Services Automobile Association (USAA), San Antonio, TX (US)

(72) Inventors: Michael Joseph Gaeta, San Antonio, TX (US); Gunjan Vijayvergia, San Antonio, TX (US); Nathan Mahoney, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,885

(22) Filed: Mar. 9, 2020

Related U.S. Application Data

(63) Continuation of application No. 15/192,637, filed on Jun. 24, 2016, now Pat. No. 10,623,250.

(51) Int. Cl.
*H04L 29/08* (2006.01)
*H04L 29/06* (2006.01)
(Continued)

(52) U.S. Cl.
CPC .... *H04L 41/0816* (2013.01); *H04L 29/08576* (2013.01); *H04L 65/1069* (2013.01);
(Continued)

(58) Field of Classification Search
CPC ................ H04L 41/0816; H04L 67/10; H04L 29/08576; H04L 65/1069; H04L 65/403; H04L 65/1066; H04L 67/14; H04W 8/22
See application file for complete search history.

(56) References Cited

U.S. PATENT DOCUMENTS 8,782,122 B1   7/2014 Chang
8,849,791 B1   9/2014 Hertschuh et al.
(Continued)

OTHER PUBLICATIONS

Honorof, "How to Set Up Google Chromecast," Tom's Guide, Mar. 13, 2017, retrieved on May 8, 2017, retrieved from URL <http://www.tomsguide.com/us/chromecast-how-to,review-1811.html>, 6 pages.

(Continued)

*Primary Examiner* — Kevin T Bates
*Assistant Examiner* — Lesa M Kennedy
(74) *Attorney, Agent, or Firm* — Fish & Richardson P.C.

(57) ABSTRACT

Techniques are described for providing a simultaneous, multi-device user experience for one or more users, on computing devices that include different capabilities for data input and/or data output. A user may register multiple devices with a service, and the service may determine capabilities of the devices for data input and data output. During a communication session involving the user and another user, such as a service representative, the service may receive input data collected through one or more devices and/or provide output data to be presented on one or more devices, where such data input and data output is received and provided according to the various input/output capabilities of the various devices. The data input and/or data output may switch from device to device during a session. In some instances, data may be replicated for presentation through multiple devices simultaneously.

20 Claims, 5 Drawing Sheets

(51) Int. Cl.
*H04W 8/22* (2009.01)
*H04L 12/24* (2006.01)

(52) U.S. Cl.
CPC .......... *H04L 65/1083* (2013.01); *H04L 67/10* (2013.01); *H04L 69/24* (2013.01); *H04W 8/22* (2013.01)

(56) References Cited

U.S. PATENT DOCUMENTS

| | | |
|---|---|---|
| 9,510,357 B1 | 11/2016 | Egner et al. |
| 9,842,584 B1 | 12/2017 | Hart et al. |
| 10,298,567 B1 | 5/2019 | Chew et al. |
| 2008/0066094 A1 | 3/2008 | Igoe |
| 2010/0261466 A1 | 10/2010 | Chang et al. |
| 2014/0047487 A1 | 2/2014 | Guedalia et al. |
| 2014/0084165 A1 | 3/2014 | Fadell et al. |
| 2014/0113617 A1 | 4/2014 | Sugaya |
| 2014/0123180 A1 | 5/2014 | Xiao et al. |
| 2014/0210734 A1 | 7/2014 | Windbrake et al. |
| 2015/0006695 A1 | 1/2015 | Gupta |
| 2015/0029880 A1 | 1/2015 | Burns et al. |
| 2015/0067541 A1 | 3/2015 | Owens |
| 2015/0019710 A1 | 5/2015 | Shaashua et al. |
| 2015/0134761 A1 | 5/2015 | Sharma et al. |
| 2015/0140990 A1 | 5/2015 | Kim et al. |
| 2015/0156349 A1 | 6/2015 | Fukushima |
| 2015/0281009 A1 | 10/2015 | Melcher et al. |
| 2015/0347114 A1 | 12/2015 | Yoon |
| 2015/0381740 A1 | 12/2015 | Gwin et al. |
| 2015/0381931 A1 | 12/2015 | Uhma et al. |
| 2016/0070244 A1 | 3/2016 | Cipollo et al. |
| 2016/0073482 A1 | 3/2016 | Fok et al. |
| 2016/0227371 A1 | 8/2016 | Wang et al. |
| 2017/0041388 A1 | 2/2017 | Tal et al. |
| 2017/0191693 A1 | 7/2017 | Bruhn et al. |
| 2017/0207926 A1 | 7/2017 | Gil et al. |
| 2017/0339629 A1 | 11/2017 | Lindoff et al. |

OTHER PUBLICATIONS

Gebhart, "How to bring Alexa into every room of your home," cnet, Feb. 2, 2017, retrieved onMay 8, 2017, retrieved from URL <https://www.cnet.com/how-to/how-to-install-alexa-in-every-room-of-your-home/>, 6 pages.
LoveMyEcho "New Amazon Echo / Alexa Smart Home Commands" Apr. 2016, pp. 1-2.
U.S. Non-Final Office Action in U.S. Appl. No. 15/886,795, dated Nov. 1, 2018, 23 pages.

MULTI-DEVICE COORDINATED USER EXPERIENCE

CROSS-REFERENCE TO RELATED APPLICATION(S)

This application is a continuation application of and claims priority under 35 U.S.C. § 120 to U.S. application Ser. No. 15/192,637, filed on Jun. 24, 2016, the entire contents of which is incorporated herein by reference.

BACKGROUND

In recent years, various ecosystems of network-connected smart appliances, Internet of Things (IoT) devices, mobile devices, and/or other computing devices have become available. Such devices may have varying capabilities with regard to data input and data output. For example, a device may accept audio input (e.g., speech input) and provide audio output, but may not include a display for visually presenting data. As another example, a device such as a television may include a large display but may lack a full-featured user interface for inputting data.

SUMMARY

Implementations of the present disclosure are generally directed to providing a coordinated user experience across multiple devices. More specifically, implementations are directed to providing a coordinated user experience across multiple devices with varying input and/or output capabilities, the user experience provided during a service session in which a service representative interacts with one or more users using the input and/or output capabilities of the multiple devices.

In general, innovative aspects of the subject matter described in this specification can be embodied in methods that include actions of: determining a first client device to be used for collecting first content during a session, the first client device being determined during the session based at least partly on the first client device including a particular data input capability for collecting the first content; receiving the first content that is collected through the first client device during the session; determining a second client device to be used for presenting second content during the session, the second client device being determined during the session based at least partly on the second client device including a particular data output capability for presenting the second content, the second client device being different than the first client device; and providing the second content for presentation through the second client device during the session.

Implementations can optionally include one or more of the following features: the first content is provided through the first client device by a first user; the second content is presented through the second client device to a second user; the first client device is in a different geographic location from the second client device; the determining of the second client device is further based on a current context of the second client device, including one or more of a location or a state of the second client device; the determining of the second client device is further based on an indication of at least one user participating in the session; the first content includes audio input provided by a first user participating in the session; the second content includes visual output provided by a second user participating in the session; the second content is determined based at least partly on the first content; the actions further include determining a third client device to be used for presenting third content during the session, the third client device being determined during the session based at least partly on the third client device including a particular data output capability for presenting the third content, the third client device being different than the first client device and the second client device; the actions further include providing the third content for presentation through the third client device during the session; at least one of the second content or the third content is replicated for presentation through both the second client device and the third client device during the session; and/or the actions further include registering the first client device and the second client device, the registering including determining and storing a set of capabilities of each of the first client device and the second client device, the set of capabilities including one or more of a data output capability or a data input capability.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Traditionally, a session in which one user (e.g., a customer) consults with another user (e.g., a service representative) would be conducted using a single device, e.g., through a telephone call or a customer service web site. However, the single device may have limited capabilities for data input and/or data output, leading to possible confusion, miscommunication, repetition, and/or other inefficiencies in conducting the session. By leveraging the various capabilities of the various computing devices that may be present in the user's environment, implementations provide for an enriched user experience for each of the individuals participating in the session compared to a traditional interaction using a single device. Through the enriched user experience, the session may proceed more quickly with a lower likelihood of confusion, miscommunication, or other problems. Accordingly, the multi-device session provided by implementations consumes less network usage time, processing capacity, memory, and/or other computing resources compared to a traditional single-device session.

Moreover, the simultaneous multi-device and/or multi-user experience provided by implementations may provide advantages in scenarios where an a service representative of an organization is interacting with a user (e.g., customer), as well as scenarios where multiple users (e.g., spouses) are participating in a same service session. In the latter scenario, the users may be geographically remote from one another. For example, one spouse may be deployed in the military, travelling for work, and so forth. In general, implementations may provide a multi-device and multi-user experience that includes a service representative and any suitable number of other users who are being assisted during a session.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
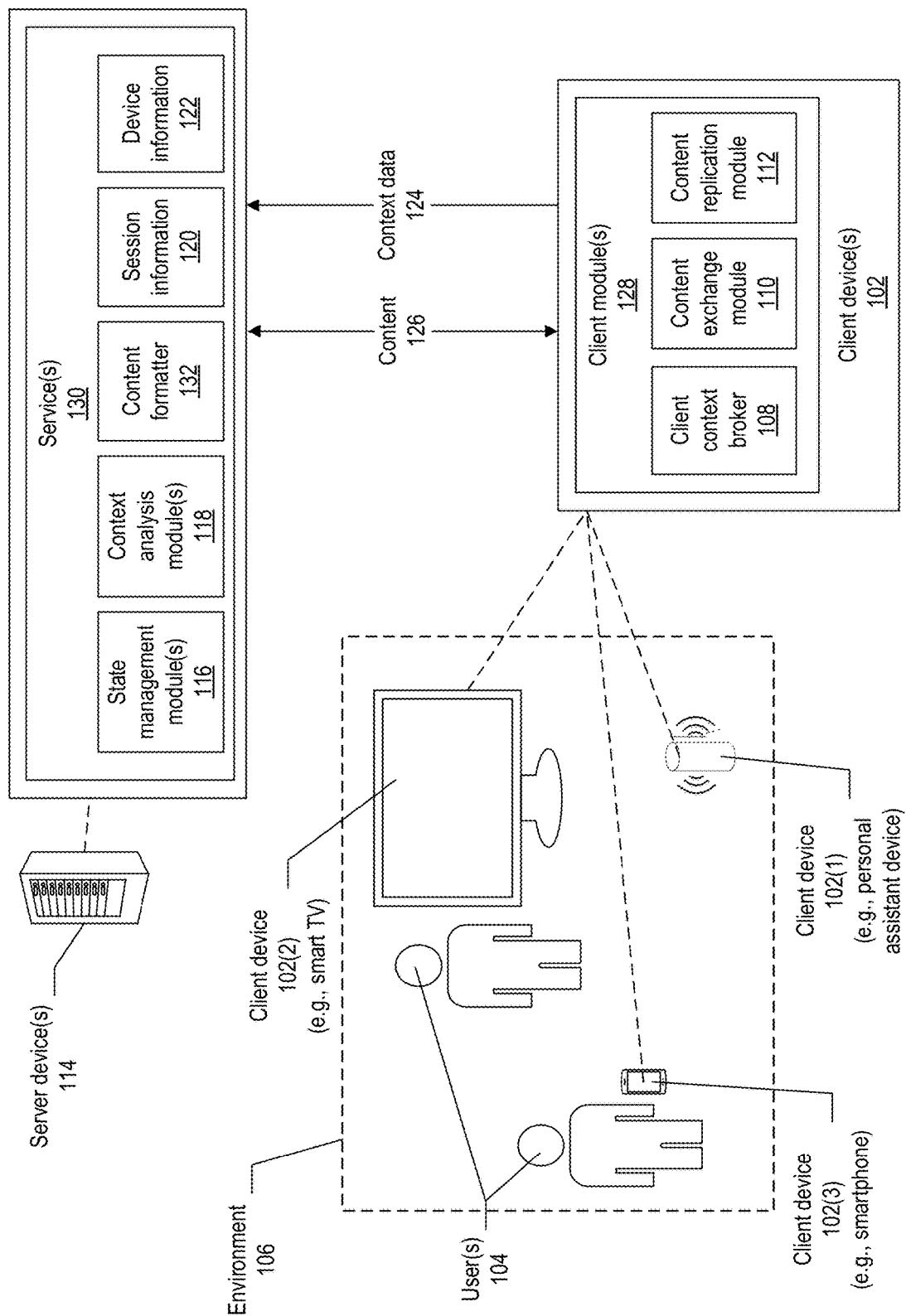
FIG. 1 depicts an example system for providing a multi-device coordinated user experience, according to implementations of the present disclosure.

Implementations of the present disclosure are directed to systems, devices, methods, and computer-readable media for providing a simultaneous, multi-device user experience for one or more users, on computing devices that include different capabilities for data input and/or data output. A user may register multiple devices with a service, and the service may determine capabilities of the devices for data input and data output. For example, the service may determine that a headless personal assistant device is able to accept speech input and provide audio output, but does not have a display. As another example, the service may determine that a smart television has a large display but a limited (or no) user interface. During a communication session involving the user and another user, such as a service representative (SR), the service may receive input data collected through one or more devices and/or provide output data to be presented on one or more devices, where such data input and data output is received and provided according to the various input/output capabilities of the various devices. The data input and/or data output may switch from device to device during a session. In some instances, data may be replicated for presentation through multiple devices simultaneously, e.g., in instances where multiple, geographically remote users are participating in a session using different, geographically separate client devices.

A user may own and/or operate various network-connected computing devices in their home, office, and/or other environments. Each of the various computing device(s) may have its own set of capabilities with regard to data input and data output to assist a user in understanding and/or controlling their environment. For example, different devices may have different sizes and/or types of displays, or may lack a display. Different devices may have different capabilities with regard to audio input and/or audio output, or may lack such capabilities. Different devices may include different types of user interfaces for text input, gestural input, interacting with graphical user interface (GUI) elements, and so forth. In some instances, a device may lack a user interface entirely, but may include display and/or audio output capabilities.

Implementations provide a simultaneous, multi-device experience for users, where such an experience has an enhanced value compared to a single device interaction. In one example scenario, a user may interact with three devices including a smartphone, a (e.g., smart) television, and a headless (e.g., no display) personal assistant (PA) device such as the Amazon Echo™. The user may initiate a session may asking the PA device to contact a financial institution to discuss refinancing the user's home. The PA device may communicate with the financial institution, which may join a SR to the session with the user. Initially, the user and the SR may communicate using the PA device as an intermediary that conveys each party's voice communications to the other. The SR may then ask the user to turn on their smart television, and the service may present visual data (e.g., refinance terms or other information) on the television display. The user may use their smartphone to enter other information, adjust terms, electronically sign a loan agreement, or perform other actions. The various actions taken by the user through their smartphone, such as adjustment in the terms of a loan agreement, may be reflected in the data that is presented on the television. Through the session, the user and the SR may continue communicating verbally through the PA device while using various other devices for data output and/or data input.

Traditionally, such a session would be conducted using a single device, such as the user logging into a customer service web site on their home computer. However, the single device may have limited capabilities. By leveraging the various capabilities of the various computing devices that may be present in the user's environment, implementations provide for an enriched user experience for each of the individuals participating in the session compared to a traditional interaction using a single device.

FIG. 1 depicts an example system for providing a multi-device coordinated user experience, according to implementations of the present disclosure. As shown in the example of FIG. 1, one or more users 104 may interact with a plurality of client devices 102 in an environment 106. The environment 106 may be a building such as a house or a room within a building. The environment 106 may also be at least partly outdoors. The client devices 102 may include any suitable type and number of computing devices. The client devices 102 may include portable (e.g., mobile) computing devices such as a smartphone, tablet computer, wearable computer, mobile gaming platform, electronic book reader, and so forth. The client devices 102 may also include less portable computing devices such as a desktop computer or laptop computer. The client devices 102 may include entertainment devices (e.g., smart televisions, stereo systems, gaming consoles), smart appliances (e.g., heating/cooling systems, refrigerators, freezers, laundry machines, ovens, etc.), and/or other types of Internet of Things (IoT) devices. The client devices 102 may also include any suitable type of personal assistant and/or artificial intelligence (AI) powered device, such as the Amazon Echo™.

The client devices 102 may each include various capabilities for data input and/or data output. Data input capabilities may include a display of any suitable type, such as a liquid crystal display (LCD) or light-emitting diode (LED)

display, that is suitable for presenting an interface such as graphical user interface (GUI), command-line interface, or other type of interface, and receiving user input through the interface. Data input capabilities may include audio input component(s) such as one or more microphones configured to receive audio (e.g., speech) input from a user, and software components to analyze and/or transcribe the audio input, such as speech-to-text (STT) module(s), semantic analysis module(s), voice recognition module(s), and so forth. Data input capabilities may include haptic input component(s) that detect vibrations, rotations, impacts, and/or other movements of the client device, such as movements caused by a user. Data input capabilities may also include any suitable number of hard controls on the client devices, such as hardware implemented buttons, knobs, slider controls, switches, toggles, keyboards, joysticks, mouse controllers, touchpads, touchscreens, and so forth. Implementations also support other appropriate types of data input capabilities.

Data output capabilities may include a display of any suitable type, such as a LCD or LED display, that is suitable for presenting a GUI, other types of graphics, images, video content, text data, and so forth. Data output capabilities may include audio output component(s) such as speakers. Data output capabilities may include haptic output component(s) such as haptic actuator(s) configured to vibrate and/or otherwise move at least a portion of a client device in response to signal(s). Data output capabilities may include any suitable number and/or type of hardware implemented outputs such as LEDs on a client device. Implementations also support other appropriate types of data output capabilities.

In some implementations, different client devices may include different data input and/or data output capabilities. For example, FIG. 1 depicts three different types of client devices 102. The example client device 102(1) is a PA device that accepts speech input commands, outputs audio data, and does not include a display. The example client device 102(2) is a smart television that outputs information through a (e.g., large) display and provides audio output, but may lack a UI or may include a UI with limited capabilities to data input. The example client device 102(3) is a smartphone that may include a (e.g., small) display as well as audio and haptic output components, and may enable data input through a GUI presented on the display, and/or through speech input.

In some instances, a single user 104 may interact with various client devices 102 in an environment 106. In some instances, multiple users 104 may interact with various client devices 102 in an environment 106. In some instances, multiple users 104 may interact with different sets of client devices 102 in different environments 106. For example, a first user 104(1) may be away from home and a second user 104(2) (e.g., the first user's spouse) may be at home. The two users 104 may participate in a same session through the multi-device cooperative user experience described herein, even though the users 104 may be physically remote from one another.

Each of the client devices 102 may execute one or more client modules 128, including a client context broker 108, a content exchange module 110, and/or a content replication module 112. The client devices 102 may each communicate, over one or more networks, with one or more server devices 114. The server device(s) 114 may include any appropriate number and/or type of computing device. The server device(s) 114 may execute various software module(s) to provide the multi-device cooperative user experience. The software module(s) may include state management module(s) 116 and context analysis module(s) 118. The server device(s) 114 may store session information 120 that describes one or more multi-device sessions each involving one or more users 104. The server device(s) 114 may also store device information 122 that describes the data input and/or data output capabilities of various client devices 102. In some implementations, one or both of the session information 120 and the device information 122 may be stored externally to the server device(s) 114 on storage device(s) that are accessible over one or more networks.

In some implementations, the server device(s) 114 may provide various service(s) 130 to the users 104. The service(s) 130 may include financial service(s) associated with banking, investment management, lending, home financing, and so forth. In some instances, the service(s) 130 may include insurance service(s) for health insurance, vehicle insurance, life insurance, homeowner's insurance, and so forth. Implementations also support other types of service(s) 130. In some implementations, the multi-device user experience may be provide as part of a multi-device session in which a user 104, such as a service representative (SR), is providing assistance to one or more other users 104 (e.g., customers) with regard to financial services, insurance services, and/or other types of services.

In some implementations, a user 104 may register a client device 102 to make that device available for use during a multi-device session. Registration may include downloading the client module(s) 128 (e.g., as an application or app) onto the client device 102. In some implementations, the user 104 may authenticate themselves with the service 130 as part of the registration process using their smartphone or other client device 102. The service 130 may then send, to the client device 102, a push notification that includes an identifier such as code and/or customer number. The user 104 may input the identifier to the client device 102 that is to be registered (e.g., the smartphone or some other client device 102). Based on a verification of the identifier, the service 130 may register the client device 102 to be available for data input and/or data output during a multi-device session. The registered client device 102 may be associated with the user 104 in the device information 122. Each client device 102 that is registered for a user 104 may add possible data input and/or data output modes for use during a multi-device session with the user 104.

In some implementations, the service 130 may determine one or more data input and/or data output capabilities of the client device 102, and store the determined capabilities of the client device 102 in the device information 122. In some examples, the client device 102 may indicate its capabilities to the service 130. In some examples, the service 130 may receive identification for the client device 102 during registration, such as a brand, manufacturer, make, model number, device type, version, and so forth. The service 130 may then determine the device's capabilities based on the identification information for the client device 102. For example, the service 130 may access a lookup table or other data structure that lists the capabilities of various client device(s) 102, and retrieve the capabilities of the particular client device 102 from the data structure. The device information 122 may indicate the particular data input and/or data output capabilities that are supported by a particular client device 102. The device information 122 may also include a more detailed description of particular capabilities of the client device 102. For example, if the client device 102 includes a display for data output, the device information 122 may include further information regarding the display, such as the type of display (e.g., LED, LCD, etc.), the size of the display (e.g., number of pixel rows and columns, dimensions, aspect ratio, etc.), the resolution, the scan type, the supported display format(s), and so forth. By storing capability information for each client device 102, the device information 122 may indicate which client device(s) 102 may be employed for various kinds of data input and/or data output during a session.

The client context broker 108 on a client device 102 may collect context data 124 that describes a current context of the client device 102. The context data 124 may include information collected by sensor(s) included in the client device 102, such as environment sensors that collect context data 124 regarding the temperature, air pressure, and/or other environmental conditions in proximity to the client device 102. The context data 124 may include a current location of the client device 102 that is determined based on signals from a satellite-based positioning system such as the Global Positioning System (GPS) or determined using other techniques. In some instances, the context data 124 may describe a current state of the client device 102 such as whether the device is currently powered on, active, suspended, asleep, and/or in some other state. The context data 124 may also describe the movement and/or orientation of the client device 102, determined based on accelerometer(s), gyroscopic sensor(s), and/or other types of sensors included in the client device 102.

The collected context data 124 may be communicated to the context analysis module(s) 118 on the server device(s) 114. The context analysis module(s) 118 may analyze the context data 124 to determine a current context of the client device 102 such as its location, the environmental context at the location, whether the device is active, asleep, or in some other state, and/or other context. In some instances, the context data 124 may be periodically collected and communicated to the context analysis module(s) 118 to enable a determination of the device's context that is periodically updated. In some implementations, the client context broker 108 may send an initial set of context data 124 and then send updated context data 124 may describes the differences and/or changes compared to the previous set of context data 124. For example, the client context broker 108 may communicate location information if the location of the client device 102 changes, but may otherwise not update the context analysis module(s) 118 with (e.g., duplicative) location information.

During a multi-device session that includes one or more users 104, a client device 102 may provide content 126 to be presented on other client devices 102. During the session, a client device 102 may receive content 126 to be presented on the client device 102. Content 126 may include any suitable type and/or amount of content, including but not limited to: text, image(s), video content, audio content, graphics content (e.g., to be presented in a GUI), haptic content (e.g., to be presented as a vibration and/or movement of the presenting device), and so forth.

The content exchange module 110 and client replication module 112 may execute on a client device 102 to provide content 126 from the client device 102 to one or more other client devices 102. The content exchange module 110 may send content 126 from one device to another. For example, content 126 that is input using a GUI on one client device 102 (e.g., a tablet computer) may be displayed on another client device 102 (e.g., a television). The content replication module 112 may enable content 126 to be at least partly replicated on multiple devices. For example, a particular image, graphic, and/or video may be (e.g., simultaneously) shown on multiple devices such as the user's smartphone, television, game console, and so forth. In such instances, changes made to the data on one client device 102 may be replicated and shown on the other client device 102. Accordingly, implementations enable a mirroring of data presented on multiple client device 102. Such mirroring may be updated in real time, e.g., simultaneously, taking into account the time needed to communicate the data between devices and the processing time on the client devices 102 and/or server device(s) 114.

The replication of data across multiple client devices 102 may also enable multiple, physically remote users 104 to particular in a same multi-device session. For example, spouses may be physically remote from one another and able to (e.g., simultaneously) view the same information regarding a home refinance, with one user 104 viewing the data on their television and the other user 104 viewing the data on their tablet computer. In some instances, a SR may act as another user 104 in such a multi-device, multi-user service session, as described in the example of FIG. 2.

The state management module(s) 116 may execute on the server device(s) 114 to manage the state of various sessions that are currently ongoing or that are in a suspended state. The statement management module(s) 116 may store and update session information 120 for each session. The session information 120 for a session may describe one or more of the following: the users 104 participating in a session; the client devices 102 being used in a session; the current context (or last known context) of each of the client devices 102; the particular data input and/or data output capabilities that are being employed for each client device 102; and/or the particular content 126 that is being presented on various client devices 102 through their various data output capabilities. In instances where the session is associated with a particular task or process, the session information 120 may also describe the current stage or step of the task or process. For example, if the session is to assist a user 104 in buying an insurance policy, the session information 120 may indicate that the user 104 has provided some of the necessary information but still needs to provide other portions of information to complete their application for the policy. In some instances, a user 104 may interrupt a session to be continued later (e.g., the next day). In such instances, the state management module(s) 116 may use the stored session information 120 to resume the session in the state where it was paused, e.g., reconnecting to the various client devices 102 and instructing the client devices 102 to present the content 126 they were previously presenting when the session was interrupted.

In some implementations, the server device(s) 114 may execute a content formatter 132 that formats the content 126 for presentation on particular client devices 102 during a session. The content formatter 132 may also be described as a data assembler, given that the content formatter 132 may receive and assemble (e.g., aggregate) data received from various sources to generate the content 126 to be presented. The content formatter 132 may format content 126 according to the device capabilities described in the device information 122. For example, content 126 to be presented on a first client device 102 with a larger display (e.g., a television) may be enriched with additional information compared to content 126 that is presented on a second client device 102 with a smaller display (e.g., a smartphone), given that expanded display capabilities of the first client device 102.

The various communications between the client devices 102 and the server device(s) 114 may be encrypted, compressed, or otherwise secured to ensure that the communicated information is not accessed by unauthorized entities.

The session information 120 and/or device information 122 may also be encrypted, compressed, or otherwise secured to protect against unauthorized access.

In some instances the multi-device session may include client devices 102 that are associated with different manufacturer "ecosystems", e.g., that employ hardware and/or software components that are manufactured and/or supported by different companies. For example, a multi-device session may include one or more client devices 102 that include hardware and/or software components from Apple™, as well as one or more client devices 102 that include hardware and/or software components from Google™. Implementations may enable such diverse client devices to be used in a same multi-device session, in contrast to traditional systems in which devices from different manufacturers may not be useable cooperatively in a same session.

Figure 2:
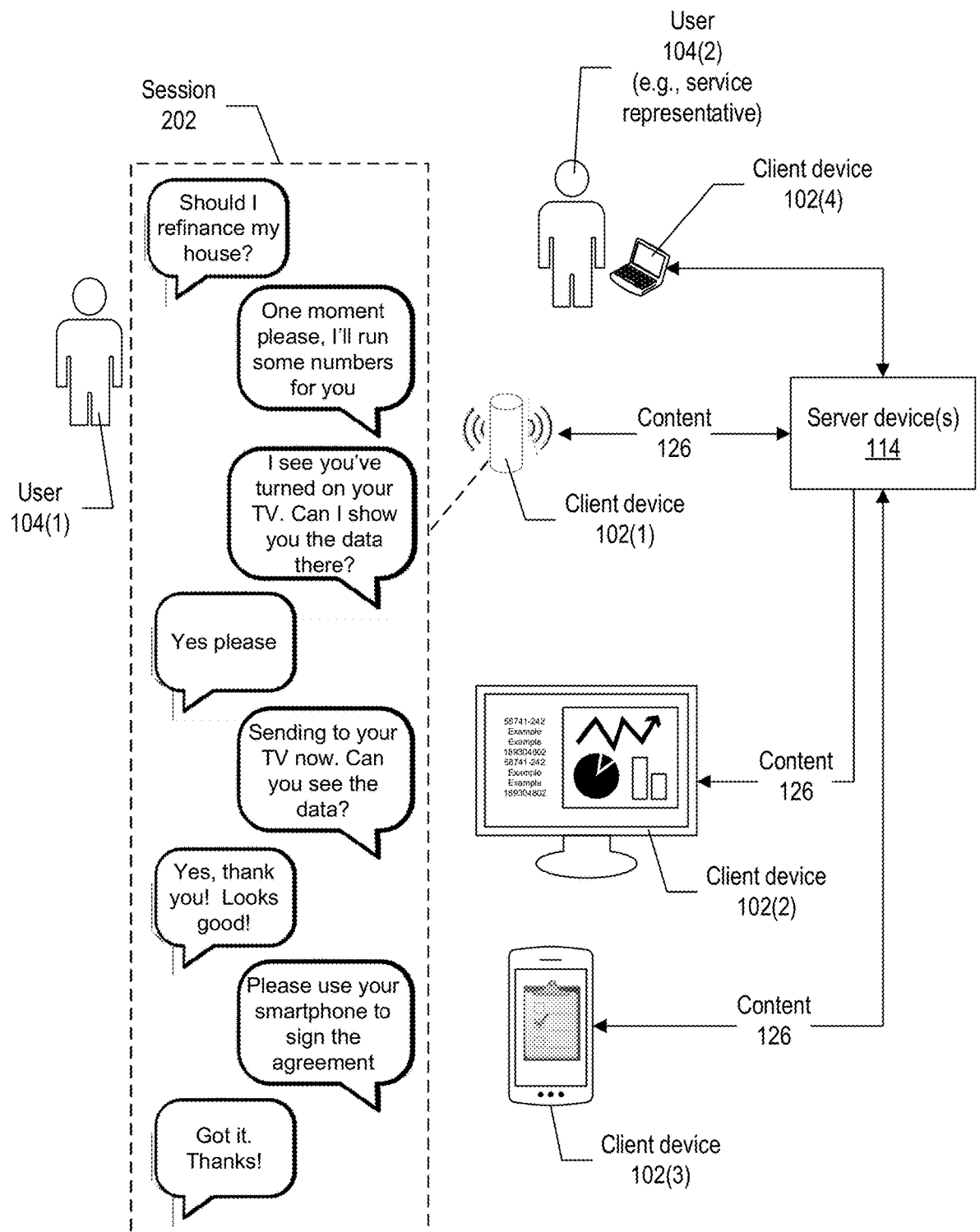
FIG. 2 depicts an example session conducted through a multi-device coordinated user experience, according to implementations of the present disclosure.

FIG. 2 depicts an example session 202 conducted through a multi-device coordinated user experience, according to implementations of the present disclosure. FIG. 2 illustrates an example use case in which a user 104(1) (e.g., a customer) is interacting with a user 104(2) (e.g., a SR) to discuss refinancing the customer's house. The users 104 are participating in the session 202 through a multi-device user experience, leveraging the various capabilities of multiple client devices 102 to provide a richer user experience compared to a traditional session that is conducted using few devices.

In the example of FIG. 2, the user 104(1) requests an initiation of the session 202 may asking their client device 102(1) (e.g., a headless PA device) "should I refinance my house?" The client device 102(1) may perform a semantic analysis of the question to pick out particular relevant keywords "refinance" and house." The client device 102(1) may communicate the customer's question as content 126 to the server device(s) 114, which may initiate a service session 202 to assist the user 104(1). The client device 102(1) and/or server device(s) 114 may access user information that indicates that the user 104(1) conducts their financial affairs with a particular bank or other financial service 130. Based on this information, the server device(s) 114 may forward the user's request to the financial service 130. A user 104(2), e.g., a SR for the service 130, may join the session 202 by sending a (e.g., voice) response "one moment please, I'll run some numbers for you." The SR may employ another client device 102(4) to interact with the server device(s) 114 and to send and/or receive content 126 during the session 202. The SR's response may be conveyed through the server device(s) 114 as content 126, and the content 126 may be presented to the user 104(1) through the audio output capabilities of the client device 102(1). In the example of FIG. 2, the users 104(2) and 104(2) may continue communicating verbally to one another during the session 202, using the server device(s) 114 as an intermediary. The server device(s) 114 may employ the client device 102(1) as an audio input device to receive the speech content of the user 104(1) and to play the speech content of the user 104(2).

The server device(s) 114 may also employ other client devices 102 to provide a richer user experience as appropriate during the session 202. For example, the server device(s) 114 may receive context data 124 indicating that the user 104(1) has activated another client device 102(2), e.g., a television. The server device(s) 114 may provide the user 104(2) with this updated context, and the user 104(2) may suggest that the television be used for presenting content 126 (e.g., "can I show you the data there?"). If the user 104(1) consents, the user 104(2) may communicate content 126 (e.g., refinance information) to the server device(s) 114 for presentation on the customer's television. The user 104(1) may then discuss the presented information with the user 104(2), ask questions, request further information, and so forth. In instances where the user 104(1) asks for a modifications of the information, such as different terms for the refinance, the user 104(2) may provide updated information which is displayed on the client device 102(2).

In the example of FIG. 2, the user 104(1) may assent to the terms of the refinance. The user 104(2) may then provide additional content 126 that is an agreement to be signed to complete the transaction. The user 104(2) may provide the additional content 126 to the server device(s) 114 and request that it be presented on the client device 102(3), e.g., the customer's smartphone, based on a determination that the client device 102(3) is currently active and able to receive and present content 126. The user 104(2) may ask the user 104(1) to view and electronically sign the agreement on the client device 102(3). The signature content 126 may then be conveyed to the user 104(2) through the server device(s) 114.

Although FIG. 2 presents an example use case involving a single user 104(1) interacting with a user 104(2) (e.g., a SR), implementations are not limited to this example. In some instances, multiple users 104(1) may be participating in the session 202 using different sets of client devices 102. In some instances, the users 104(1) may be physically remote from one another. For example, one family member may be at home and participating in the session 202 using the client device 102(1) (e.g., PA device) for audio input and output, using the client device 102(2) (e.g., television) to view graphics or other data, and using the client device 102(3) (e.g., smartphone) to view other data and/or provide input (e.g., a signature). Another family member may also be participating in the session 202 from a remote location, using their tablet computer for audio input/output, to view graphics (e.g., the refinance information), and to provide input (e.g., their signature) through the GUI of the tablet computer. In such instances, the content 126 may be replicated across the various client device(s) 102 for each of the users 104(1), with the content 126 formatted appropriately for presentation on the different devices with different display capabilities.

In some implementations, the determination of which client device 102 to employ for data input and/or data output may be based on one or more of the following criteria: the particular content 126 to be collected from and/or presented on the client device(s) 102; the current context of the client device(s) 102; and/or an indication from the user(s) 104 participating in the session 202. The particular content 126 may dictate which client device(s) 102 to be used during a session 202. For example, if video content 126 is to be presented to user(s) 104, implementations may employ, for the data output, a client device 102 that includes a display capable of presenting video content. As another example, if user input is to be collected from a user 104 (e.g., the user's signature), implementations may employ, for the data input, a client device 102 that includes a display capable of presenting a GUI configured to collect the appropriate input. As another example, if audio output is to be provided to user(s) 104, implementations may employ, for the data output, a client device 102 that includes audio output capabilities (e.g., speakers and/or appropriate audio processing software). In instances where multiple client devices 102 have the suitable capabilities for a particular task, multiple client devices 102 may be used (e.g., simultaneously) for data input and/or data output during a session 202.

In some instances, the current context of the client devices 102 registered for a user 104 may be used to determine which client device(s) 102 to use for data input and/or data output. For example, client device(s) 102 may be employed if they are currently in an active state. In some implementations, if a suitable client device 102 is currently inactive (e.g., asleep, suspended), the server device(s) 114 may send an activation signal to the client device 102 to activate it for data input and/or data output. In some instances, a user 104 may be prompted to turn on or otherwise activate a client device 102 so that it may be used during a session 202. In some examples, location context may be employed to determine client device(s) 102 to be used. For example, based on the location of the user's smartphone, the service 130 may infer that the user 104 is currently at home in an environment 106 with other client device(s) 102 such as a television, PA device, game console, smart appliances, desktop computer, and so forth. Accordingly, such other client device(s) 102 may be used, as appropriate, for data input and/or data output if the user 104 remains at home during the session 202. As another example, the service 130 may infer that the user 104 is not currently at home and is instead in a hotel. The service may then suggest that the user 104 turn on their tablet to use the tablet's display during a session 202. As another example, the service 130 may determine that the user 104 is in their car based on a changing location of the user 104, and the service 130 may employ an automotive computer in the user's car for audio input/output and/or other capabilities.

In some instances, the user 104 may indicate which client device(s) 102 are to be used for data input and/or data output. Such an indication may be made explicitly by the user 104, e.g., through inputs to a UI and/or voice requests. Such an indication may also be inferred based on other user actions. For example, if the user 104 turns on their television during a session 202, an inference may be made that the user 104 would like to use the television for displaying information. The SR may then ask the user 104 if the user 104 would like to use the television for data output. In some implementations, the client device 102 to be used for data input and/or data output may be inferred based on the device that the user 104 is currently using, e.g., the device that the user 104 employed to request a session 202, authenticate themselves to the service 130, or perform other actions.

In some implementations, a client device 102 may advertise its presence to the service 130 and indicate its availability for data input and/or data output. In some implementations, the service 130 may occasionally ping or otherwise query various client device(s) 102 to determine whether they are active and available for use. In some implementations, the service 130 may send a signal to wake up and/or otherwise activate a client device 102 if it is in a suspended state.

Figure 3:
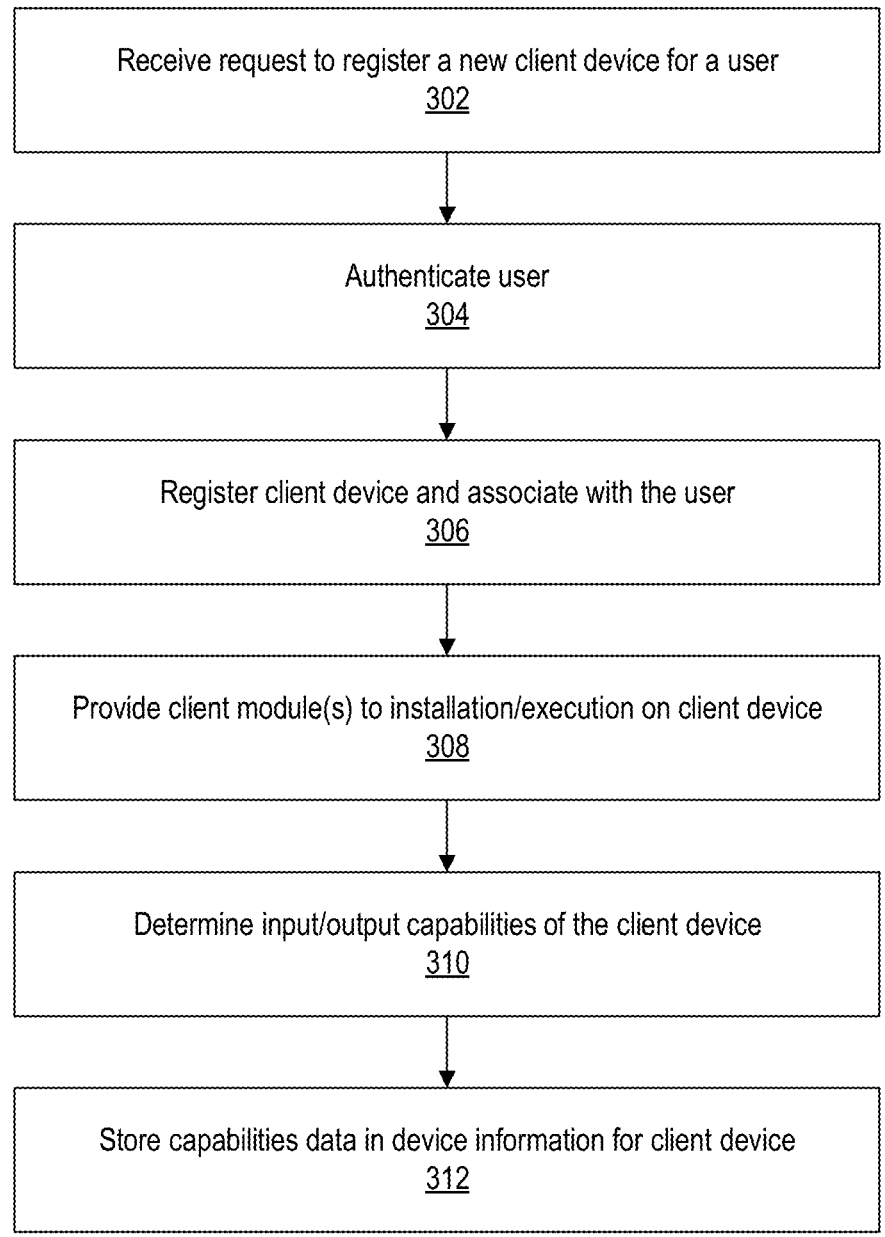
FIG. 3 depicts a flow diagram of an example process for registering a client device, according to implementations of the present disclosure.

FIG. 3 depicts a flow diagram of an example process for registering a client device 102 for use in a multi-device session, according to implementations of the present disclosure. Operations of the process may be performed by one or more of the client module(s) 128, the client context broker 108, the content exchange module 110, the content replication module 112, the state management module(s) 116, the context analysis module(s) 118, and/or other software module(s) executing on the client device(s) 102, the server device(s) 114, or elsewhere.

A request may be received (302) to register a new client device 102 for a user 104, as described above. In some implementations, the user 104 may be authenticated (304) as an authorized user of the service 130 prior to proceeding with registration of the client device 102. If the user 104 is authenticated, the client device 102 may be registered (306) as described above and associated with the particular user 104. In some implementations, registration may include providing (308) the client module(s) 128 for installation and execution on the client device 102. The input and/or output capabilities of the client device 102 may be determined (310) as described above, and stored (312) in the device information 122 for the client device 102. Following a successful registration of the client device 102 with the service 130, the client device 102 may be employed (according to its capabilities) for data input and/or data output during a session 202, as described further with reference to FIG. 4.

Figure 4:
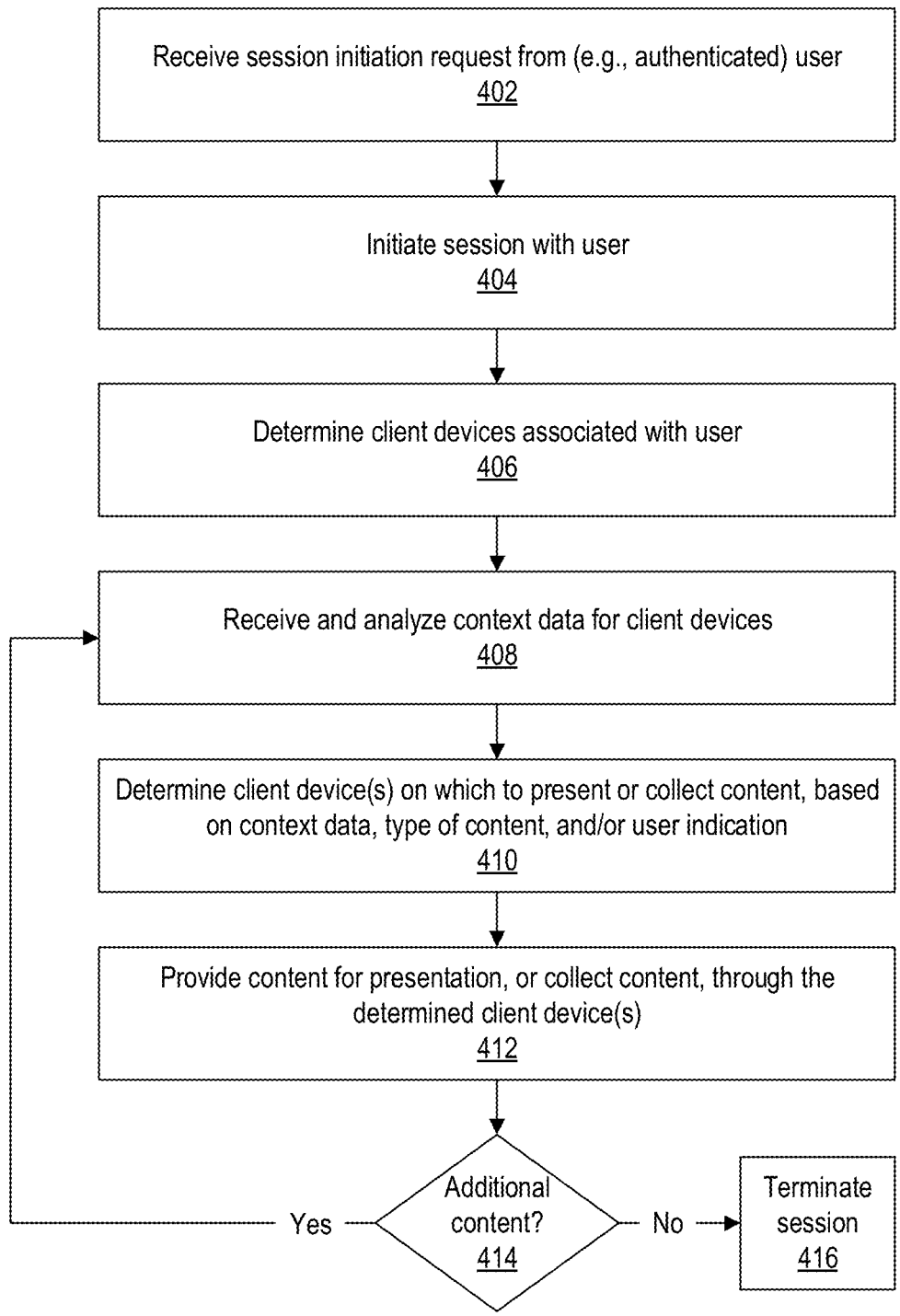
FIG. 4 depicts a flow diagram of an example process for providing a multi-device coordinated user experience, according to implementations of the present disclosure.

FIG. 4 depicts a flow diagram of an example process for providing a multi-device coordinated user experience, according to implementations of the present disclosure. Operations of the process may be performed by one or more of the client module(s) 128, the client context broker 108, the content exchange module 110, the content replication module 112, the state management module(s) 116, the context analysis module(s) 118, and/or other software module(s) executing on the client device(s) 102, the server device(s) 114, or elsewhere.

A session initiation request may be received (402) from user(s) 104. In some instances, the user(s) 104 may be authenticated with the service 130 prior to initiation of the session 202. A session 202 may be initiated with the user(s) 104. Session initiation may include initializing a portion of the session information 120 for use in tracking the state of the session 202. One or more client devices 102 may be determined (406) that are associated with the user(s) 104. In some examples, the client device(s) 102 may be associated with the user(s) 104 in the device information 122, the client device(s) 102 having previously been registered with the service 130.

Context data 124 for the client device(s) 102 may be received and analyzed (408) to determine a current context for each of the client device(s) 102. The service 130 may determine (410) one or more client device(s) 102 to be used for data input and/or data output during a session 202. As described above, the determination may be based on the particular types of content 126 to be presented or collected (e.g., visual data vs. audio data, etc.), the current context of the client device(s) 102, and/or indication(s) from the user(s) 104 in the session 202.

In some implementations, the service 130 may decide between multiple possible client devices 102 to determine an optimal client device 102 to use based on the relative capabilities of the client devices 102. For example, a determination may be made that a user 104 has registered multiple client devices 102 that include a display capability, such as a smartphone, a tablet computer, and a television. If there is a large quantity of graphical content 126 or video content 126 to be presented, a determination may be made to use the available device with the largest display (e.g., the television). If the content 126 includes text that may be difficult to read on a television, a determination may be made to use the tablet computer. In some implementations, the service 130 may track preference information for the user 104 and determine client device(s) 102 to use based on the preference information.

For example, preference information collected during previous sessions 202 with a user 104 may indicate that the user 104 prefers to view GUIs on their tablet computer instead of their smartphone, and prefers to hear audio output through their home stereo system instead of through their PA device. Such preference information may be employed in determining the client device(s) 102 to use during subsequent sessions 202 with the user 104.

The content 126 may be provided (412) for presentation on the client device(s) 102, and/or collected as input to the client device(s) 102. If no additional content 126 is to be presented or collected (414), the session 202 may be terminated (416). If additional content 126 is to be presented and/or collected (414), the process may return to 408. In this manner, implementations may monitor device availability and capabilities during a session 202 and dynamically determine how to present content 126 and/or collect content 126 from client device(s) 102 as appropriate for the particular content 126.

In some implementations, the determination of the particular client device(s) 102 to use for presenting and/or collect content 126 during a session 202 may be dynamically determined during the session 202. As described above, this dynamic determination may be based on the particular content 126 to be presented and/or collected, the current context of the client device(s) 102 registered to or otherwise associated with the users 104 involved in the session 202, and/or the indication(s) received from user(s) 104. In some implementations, a dynamic determination of device(s) includes a determination of device(s) that is made during the session 202, and that is not statically predetermined prior to an initiation of the session 202. Through dynamic determination of input and/or output device(s) to use during a session, implementations are able to dynamically respond as a session 202 (e.g., data-enriched conversation) develops organically between users 104 in manner that may not have been predictable prior to initiation of the session 202. For example, while discussing an auto insurance claim the users 104 in a session 202 may decide that it would be helpful to view image(s) of damage caused to a vehicle during an accident. The SR in the session 202 may ask that the customer activate their television, and the SR may provide the image(s) to be presented through the display of the television.

Figure 5:
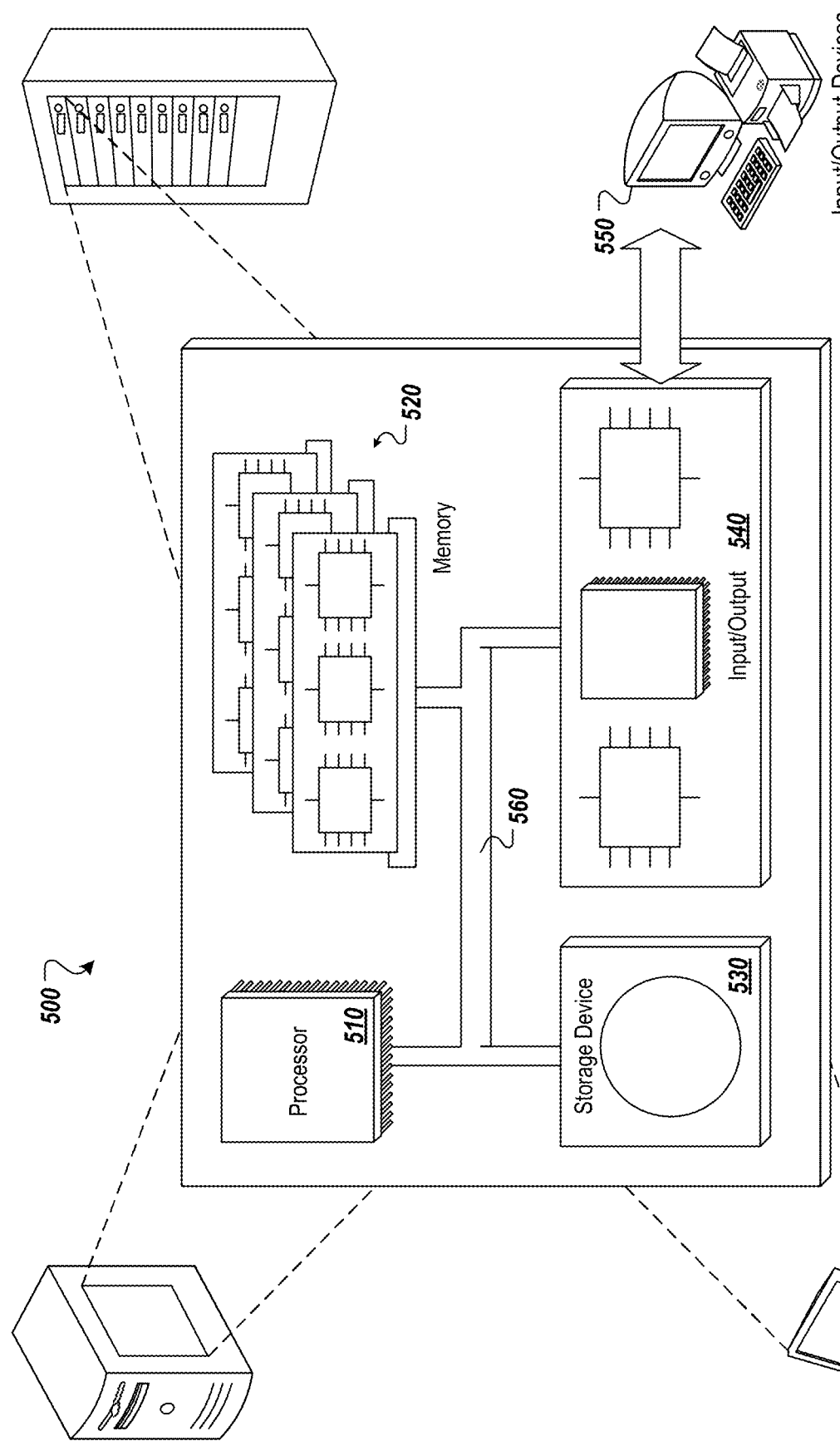
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the client device(s) 102, the server device(s) 114, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display)

monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:

determining, by the at least one processor, a first client device to be used for collecting first content during a communication session between the first client device and a service representative (SR) device, the first client device being determined during the communication session based at least partly on the first client device including a particular data input capability for collecting the first content;

receiving, by the at least one processor, the first content that is collected through the first client device during the communication session;

determining, by the at least one processor, a second client device to be used for presenting second content during the communication session, the second client device being determined during the communication session based at least partly on the second client device including a particular data output capability for presenting the second content, the second client device being different than the first client device;

providing, by the at least one processor, the second content for presentation through the second client device during the communication session;

storing session information of the communication session, the session information indicating that the first client device is being used for collecting the first content and the second client device is being used for presenting the second content; and reestablishing, by accessing the stored session information and upon an interruption of the communication session, the communication session by continuing the use of the first client device for collecting the first content and continuing the use of the second client device for presenting the second content.

2. The method of claim 1, wherein:
the first content is provided through the first client device by a first user participating in the communication session;
the second content is presented through the second client device to a second user participating in the communication session; and
the first client device is in a different geographic location from the second client device.

3. The method of claim 1, wherein the determining of the second client device is further based on a current context of the second client device, including one or more of a location or a state of the second client device.

4. The method of claim 1, wherein the determining of the second client device is further based on an indication of the SR using the SR device.

5. The method of claim 1, wherein:
the first content includes audio input provided by a first user participating in the communication session;
the second content includes visual output provided by a second user participating in the communication session; and
the second content is determined based at least partly on the first content.

6. The method of claim 1, further comprising:
determining, by the at least one processor, a third client device to be used for presenting third content during the communication session, the third client device being determined during the communication session based at least partly on the third client device including a particular data output capability for presenting the third content, the third client device being different than the first client device and the second client device; and providing, by the at least one processor, the third content for presentation through the third client device during the communication session.

7. The method of claim 6, wherein at least one of the second content or the third content is replicated for presentation through both the second client device and the third client device during the communication session.

8. The method of claim 1, further comprising:
registering, by the at least one processor, the first client device and the second client device, the registering including determining and storing a set of capabilities of each of the first client device and the second client device, the set of capabilities including one or more of a data output capability or a data input capability.

9. A system, comprising:
at least one processor; and
a memory communicatively coupled to the at least one processor, the memory storing instructions which, when executed by the at least one processor, cause the at least one processor to perform operations comprising:
determining a first client device to be used for collecting first content during a communication session between the first client device and a service representative (SR) device, the first client device being determined during the communication session based at least partly on the first client device including a particular data input capability for collecting the first content;
receiving the first content that is collected through the first client device during the communication session;
determining a second client device to be used for presenting second content during the communication session, the second client device being determined during the communication session based at least partly on the second client device including a particular data output capability for presenting the second content, the second client device being different than the first client device;
providing the second content for presentation through the second client device during the communication session;
storing session information of the communication session, the session information indicating that the first client device is being used for collecting the first content and the second client device is being used for presenting the second content; and
reestablishing, by accessing the stored session information and upon an interruption of the communication session, the communication session by continuing the use of the first client device for collecting the first content and continuing the use of the second client device for presenting the second content.

10. The system of claim 9, wherein:
the first content is provided through the first client device by a first user participating in the communication session;
the second content is presented through the second client device to a second user participating in the communication session; and
the first client device is in a different geographic location from the second client device.

11. The system of claim 9, wherein the determining of the second client device is further based on a current context of the second client device, including one or more of a location or a state of the second client device.

12. The system of claim 9, wherein the determining of the second client device is further based on an indication of the SR using the SR device.

13. The system of claim 9, wherein:
the first content includes audio input provided by a first user participating in the communication session;
the second content includes visual output provided by a second user participating in the communication session; and
the second content is determined based at least partly on the first content.

14. The system of claim 9, the operations further comprising:
determining a third client device to be used for presenting third content during the communication session, the third client device being determined during the communication session based at least partly on the third client device including a particular data output capability for presenting the third content, the third client device being different than the first client device and the second client device; and
providing the third content for presentation through the third client device during the communication session.

15. One or more non-transitory computer-readable media storing instructions which, when executed by at least one processor, cause the at least one processor to perform operations comprising:
determining a first client device to be used for collecting first content during a communication session between the first client device and a service representative (SR) device, the first client device being determined during the communication session based at least partly on the first client device including a particular data input capability for collecting the first content;
receiving the first content that is collected through the first client device during the communication session;
determining a second client device to be used for presenting second content during the communication session, the second client device being determined during the communication session based at least partly on the second client device including a particular data output capability for presenting the second content, the second client device being different than the first client device;
providing the second content for presentation through the second client device during the communication session;
storing session information of the communication session, the session information indicating that the first client device is being used for collecting the first content and the second client device is being used for presenting the second content; and
reestablishing, by accessing the stored session information and upon an interruption of the communication session, the communication session by continuing the use of the first client device for collecting the first content and continuing the use of the second client device for presenting the second content.

16. The one or more non-transitory computer-readable media of claim 15, wherein the determining of the second client device is further based on an indication of the SR using the SR device.

17. The one or more non-transitory computer-readable media of claim 15, wherein:
the first content includes audio input provided by a first user participating in the communication session;

the second content includes visual output provided by a second user participating in the communication session; and the second content is determined based at least partly on the first content.

18. The one or more non-transitory computer-readable media of claim 15, the operations further comprising:

determining a third client device to be used for presenting third content during the communication session, the third client device being determined during the communication session based at least partly on the third client device including a particular data output capability for presenting the third content, the third client device being different than the first client device and the second client device; and providing the third content for presentation through the third client device during the communication session.

19. The one or more non-transitory computer-readable media of claim 18, wherein at least one of the second content or the third content is replicated for presentation through both the second client device and the third client device during the communication session.

20. The one or more non-transitory computer-readable media of claim 15, the operations further comprising:

registering the first client device and the second client device, the registering including determining and storing a set of capabilities of each of the first client device and the second client device, the set of capabilities including one or more of a data output capability or a data input capability.

\* \* \* \* \*